United States Patent [19]
Garst

[11] Patent Number: 5,465,523
[45] Date of Patent: Nov. 14, 1995

[54] UNDULATING SINGLE TAIL FISHING LURE

[76] Inventor: Gregory C. Garst, Rte. 3, Box 478, Many, La. 71449

[21] Appl. No.: 787,579

[22] Filed: Nov. 4, 1991

[51] Int. Cl.$^6$ .................................................. A01K 85/00
[52] U.S. Cl. ........................................ 43/42.24; 43/42.26
[58] Field of Search ............................. 43/42.24, 42.26, 43/42.28

[56] References Cited

U.S. PATENT DOCUMENTS

| | | | |
|---|---|---|---|
| D. 239,281 | 3/1976 | Williams | 43/42.24 |
| D. 288,347 | 2/1987 | Lumsden | 43/42.24 |
| 2,690,026 | 9/1954 | King | 43/42.24 |
| 2,785,497 | 3/1957 | Berry | 43/42.26 |
| 3,037,316 | 6/1962 | De Zeeuw | 43/42.28 |
| 3,158,952 | 12/1964 | Creme | 43/42.24 |
| 3,349,513 | 10/1967 | Jeff | 43/42.24 |
| 3,861,073 | 1/1975 | Thomassin | 43/42.24 |
| 4,592,161 | 6/1986 | Smith | 43/42.24 |
| 4,619,069 | 10/1986 | Strickland | 43/42.26 |
| 4,744,168 | 5/1988 | McClellan | 43/42.24 |
| 4,790,100 | 12/1988 | Green | 43/42.26 |
| 4,858,367 | 8/1989 | Rabideau | 43/42.28 |
| 4,870,775 | 10/1989 | Schrader | 43/42.24 |
| 4,885,867 | 12/1989 | Leal | 43/42.24 |
| 4,887,377 | 12/1989 | Morris | 43/42.24 |

*Primary Examiner*—Kurt C. Rowan

[57] ABSTRACT

A fishing lure of resilient material which when retrieved from the water successfully duplicates the natural swimming motion of an eel or a snake such that the head and the tail of the lure moves back and forth along the longitudinal axis of the lure. The lure has an elongated head portion with ridges, a mid-body portion with a U-shaped configuration, and an enlarged tail portion. The lure is characterized by a predetermined resilience, and along with its U-shaped configuration, causes undulating motion of the head and tail portions. As the lure is retrieved from the water, the water forces cause the lure to reach toward a linear configuration until the lure resiliency has reached a maximum, whereupon, the lure reverts to its U-shaped configuration and so on. An alternative embodiment of the lure characterizes a lizard.

28 Claims, 2 Drawing Sheets

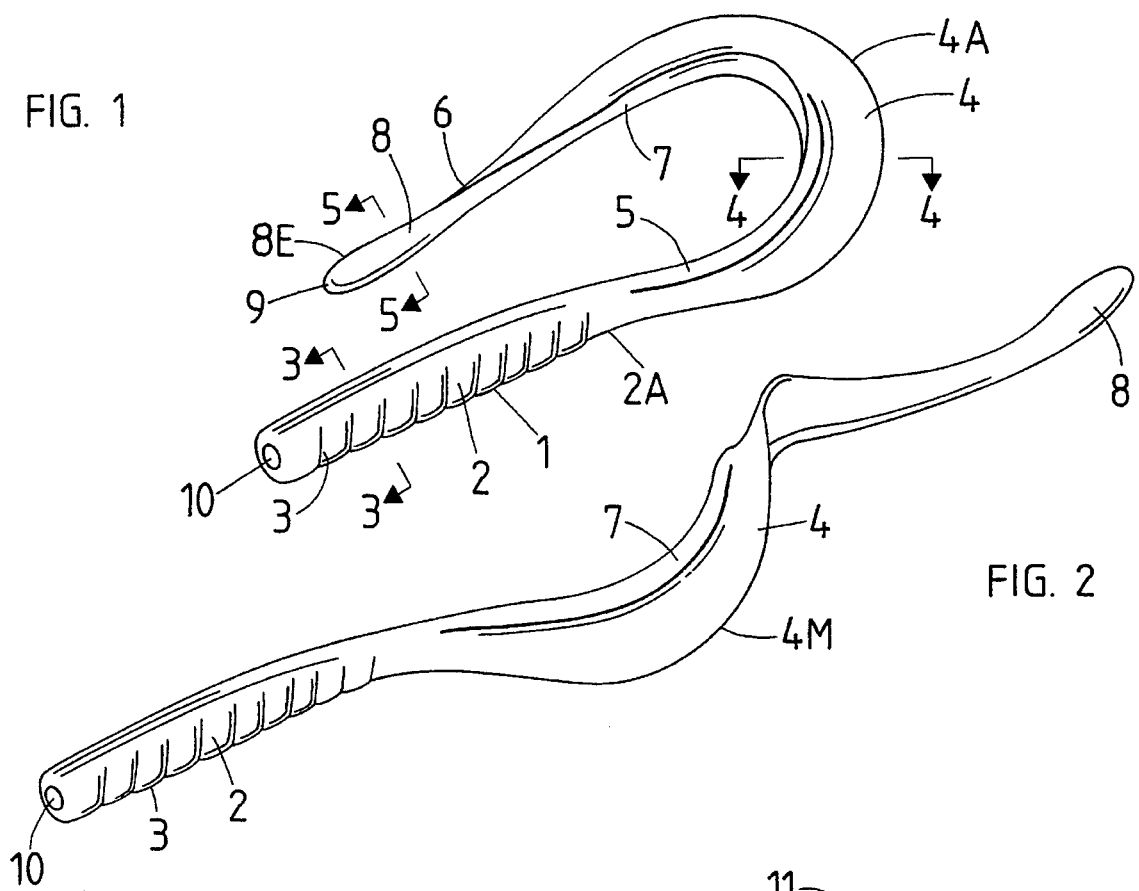
FIG. 1
FIG. 2
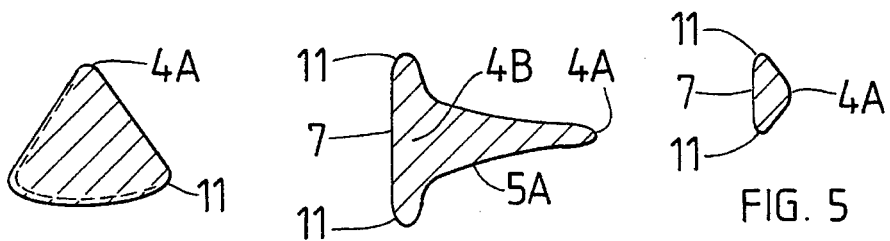
FIG. 3
FIG. 4
FIG. 5
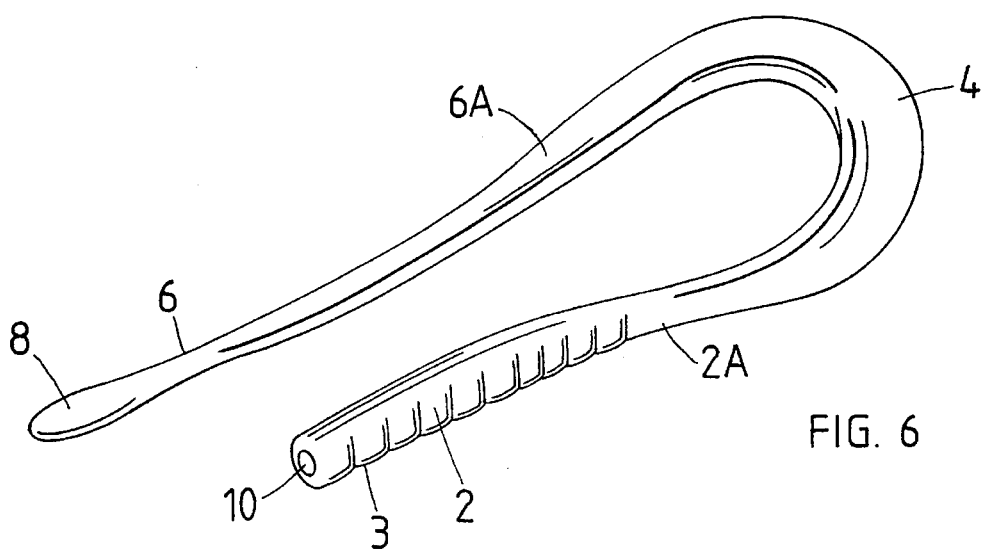
FIG. 6

5,465,523

UNDULATING SINGLE TAIL FISHING LURE

BACKGROUND OF THE INVENTION

1. Field of the Invention

This invention relates to fishing lures and more particularly to fishing lures of the flexible plastic design which are normally injection molded and are designed to simulate plastic worms, lizards, and other swimming creatures which attract bass and other game fish.

Plastic fishing lures are typically used in cooperation with a lead sinker or helmet which is placed on the fishing line immediately above the hook with the hook projected through the fishing lure in a variety of configurations. The lead sinker or the helmet allows the worm and the hook to sink to the bottom of the lake or reservoir and the worm is retrieved using a variety of rod actions, depending upon the type of fish sought, the water depth and weather conditions. Alternatively, these lures can be used as "trailers" attached to other baits such as the popular "spinner baits" to attract fish.

Many of these plastic lures are characterized by long, thin ribbon tails which are curved or shaped to present wiggling or undulating simulated swimming action in the water when achieved in order to further attract fish to the lure. A variety of tail shapes, sizes, and thicknesses are currently used in many of the plastic fishing lures which are on the market today.

2. Description of Prior Art

Typical of the plastic fishing lures used with good success in catching black bass, small mouth bass, and other game fish is the "curly tail" lure which is characterized by a beaded or smooth body portion having one or more tail segments extending therefrom and curled inwardly or outwardly to a thin ribbon like point. When the lure is retrieved, the lure or the tail unfurls behind the lure and undulates or folds and unfolds as it "swims" through the water to attract fish. Since the lure is shaped from a plastic material it can be easily injection molded in a variety of colors, shapes, and desirable odors can even be synthesized and provided in the lure bodies. Other lures, similar in form, are characterized by a "moving ribbon" appearance as they are drawn through the water.

Other popular fishing lures include the crawfish imitation variety. Crankbaits in color patterns designed to mimic crawfish are perennial popular items, as are plugs sculpted to resemble crawfish. Lures that hint at being crawfish parallel the strong market for recognizable soft plastic craws. The most common variation on the crawfish theme is a small plastic body with a collar or skirt of waving tentacles, often combined with a twin-tail grub trailer.

All of the lures known to this applicant are of this type, but none of the type presented here. None are known to provide complete body undulations as they are drawn through the water.

It is an object of this invention to provide a new soft plastic lure which is characterized by a ridged head portion, a curved U-shaped portion comprising the mid-body, and an enlarged tail ending.

It is the object of this invention to provide or impart separate undulating actions of both the head portion of the lure and the tail portion of the lure.

It is the object of this invention to impart this undulating movement of the head portion as that lure is retrieved from the water in a back and forth manner, wherein the head portion crosses the central plane parallel to the longitudinal axis of the lure as the lure is retrieved from the water. This unique movement of the invention has not been seen heretofore, and unknown in the prior art.

Another object of this invention is to provide a new plastic lure which is characterized by undulating movement of the lure's tail. The movement of the tail portion also crosses the central plane parallel to the longitudinal axis of the lure in a back and forth manner. Again, such undulating movement has not been seen in prior art made of single tails.

Another object of this invention is to provide a new plastic lure which is characterized by movement of both the head portion of the lure and the tail portion of the lure in a simultaneous undulating fashion as the lure is retrieved from the water. Such new and unique swimming action reproduces identical swimming motion, to that of a snake, eel, lizard, or other similar live prey in their natural environment.

Still another object of this invention is to provide a new plastic worm type lure in a variety of sizes duplicating natural lures and other live prey in their natural environment. As such, the tapering tail portion of the lure may be short in the preferred embodiment, and longer extending beyond the head portion in the alternative embodiment. Thus, in the latter embodiment, the lure has a longer tail appearance.

Still another object of this invention is to provide a new plastic worm type lure in a variety of sizes duplicating natural lures and other live prey in their natural environment. As such, an alternative embodiment is the lizard, with a plurality of legs, each with a plurality of claws, with a U-shaped tail portion.

A still further object of the invention is to provide a plastic lure of a new design which includes a variety of colors duplicating bait fish and other live prey in their natural environment. Thus, the lure is made of solid colors, multicolor bodies, laminate colors, and laser colors.

SUMMARY OF THE INVENTION

The objects of the invention are provided in a new and improved soft plastic lure which is characterized in a preferred embodiment by a mid-body portion in a U-shaped configuration. The lure in its natural form is molded in a U-shape with the head portion forming one leg of the horseshoe, and the tail portion forming the other leg of the horseshoe. The head portion of the lure is a tapering body with ridges joined by the mid-body portion. The mid-body portion is generally of triangular shape with a relatively tall apex and a relatively short base. The tail portion begins where the mid-body ends and tapers generally before ending in an enlarged manner. Thus, when the lure is shaped and made as described, it imparts lifelike action of an eel or a snake duplicating their natural swimming motion and enticing game fish.

An alternate embodiment is that of a lizard. This embodiment has a relatively short head, an elongated mid-body portion characterized by a plurality of legs, and a U-shaped tail portion imparting an undulating motion.

BRIEF DESCRIPTION OF THE DRAWINGS

The invention will be better understood by reference to the accompanying drawings, wherein:

FIG. 1 is a perspective view of the fishing lure in its natural position in the preferred embodiment of the invention.

FIG. 2 is a perspective view of the single tail fishing lure in a longitudinal stretched position of the preferred embodiment of the invention.

FIG. 3 is a cross-sectional view of the head portion of the single tail or preferred embodiment of the invention.

FIG. 4 is a cross-sectional view of the mid-body portion in the preferred embodiment of the invention.

FIG. 5 is a cross-sectional view of the enlarged tail portion of the single tail lure in the preferred embodiment of this invention.

FIG. 6 is a perspective view of the single tail lure in the alternate embodiment of the invention.

DETAILED DESCRIPTION OF THE PREFERRED AND ALTERNATE EMBODIMENTS

Figure 7:
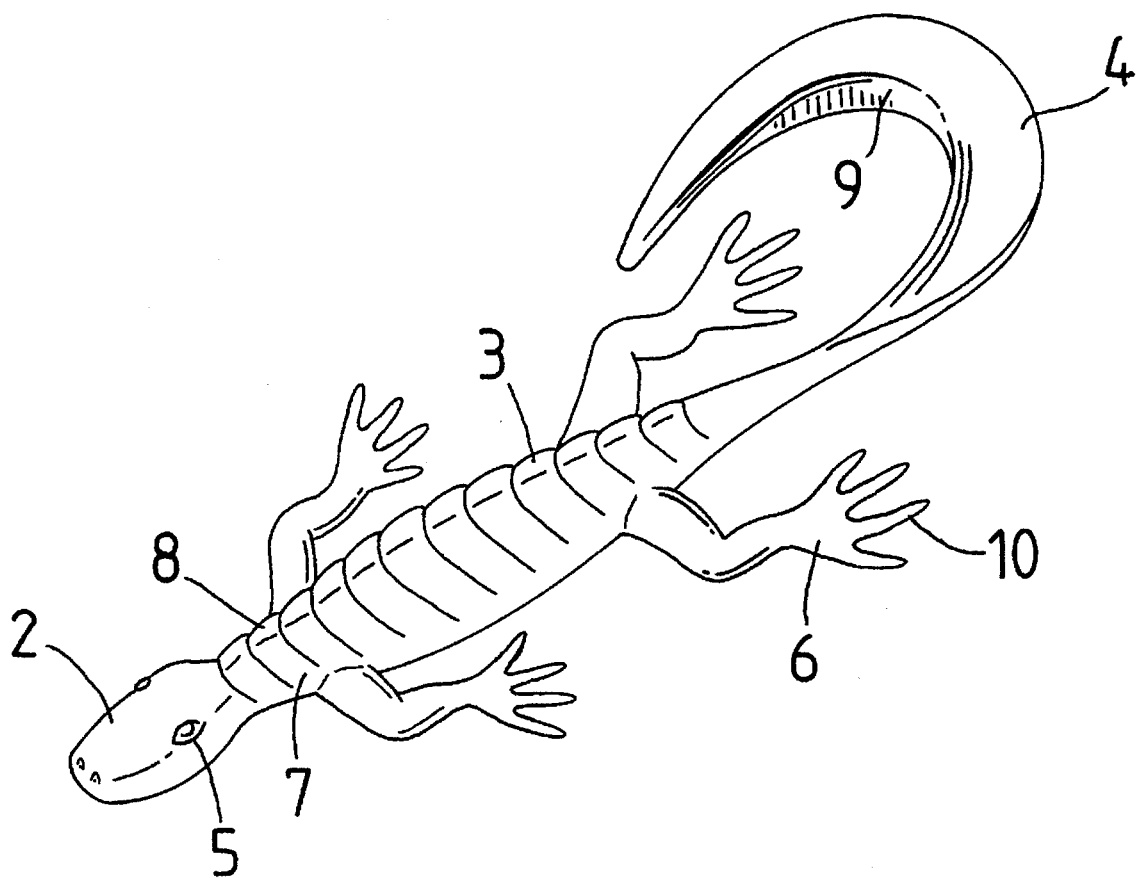
FIG. 7 is a perspective view of an alternate embodiment of the invention.

Referring initially to FIG. 1 of the drawings in a preferred embodiment, the single tail lure of this invention is generally identified as reference numeral 1. The single tail lure 1 includes a head portion 2 which tapers generally up to the point 2A where it meets the mid-body portion 4 of the lure 1. The elongated head portion 2 is segmented or ridged 3 to the point 2A where the mid-body portion begins. The face 10 of the head portion 2 is flat and blunt, and wherein a fishing hook is inserted or pierced and pushed inward through the head portion 2. The hook is then protruded out of the head portion 2 on the base or bottom side 7 and pushed back into the head portion towards the tapering end.

The mid-body portion 4 begins where the head portion ends 2A and in its natural position is U-shaped or curled. The mid-body portion 4 is of a generally triangular cross-section with a tall apex 4A and a short base 7. The sides 5 may be slightly curved in a concave manner. Since the mid-body portion 4 in its natural molded state is constructed in a U-shape, the lure 1 forms a curl when it is laid flat in a longitudinal manner in a static mode. The apex 4A of the mid-body portion 4 is the tallest at the mid-point 4M of the mid-body portion 4 and generally tapers where it joins the head portion 2 and the tail portion 8, respectively. The mid-body portion 4 of the lure 1 is illustrated in FIG. 4. It shows, in cross section, that the mid-body portion 4 characterizes the stabilizing position of the lure 1 during travel through the water. The mid-body portion 4 itself stands relatively erect and is oriented vertically, but for the fact that the cross-section of the lure 1 changes when moving from the head portion 2 towards the tail portion 8, which of course affects the inherent resilience of movement back and forth in the water.

In the preferred embodiment of FIG. 1, one may see that the mid-body portion 4 is skewed 5A toward the interior surface 5 of the U-shaped configuration, and thus the larger mass resides at the interior 5 of the U-shaped configuration. The heavier mass of material at the interior or base 4B along the longitudinal axis of the lure 1 enhances resistance against the tendency of the lure to "straighten" as it is drawn through the water and simultaneously enhances the oscillating action of the lure 1. Casual examination of FIG. 1, FIG. 4 and FIG. 5 show that the thickness of the mid-body portion 4 decreases at the distal ends 4, 10 thereof and thus the resistance to the water action against the surface 5A of the mid-body portion 4 similarly decreases as it is drawn through the water. As is best shown in FIG. 1, the mid-body portion 4 is prominent only in the mid-section 4—4 of the lure 1 since both the head portion 2 and tail portion 8 serve respectively, separate functions.

The relatively short tail portion 8 begins where the mid-body portion 4 ends 6 and is generally enlarged up to the mid-point 8E of the tail portion 8 and then generally tapers off to end 9. The tail portion 8 has a wide base 7 and a short apex 4A. The enlarged tail portion 8 is short and is generally oval shaped.

In the alternative embodiment of this invention, the mid-body portion 4 is elongated substantially 6A up to the point 6 where the mid-body portion 4 joins the tail portion 8. This portion 6A of the mid-body is much longer so that in the natural curled position, the tail portion 8 of the lure is much longer than the head portion 2 of the lure 1.

The single tail fishing lure 1 imparts the most lifelike action out of a piece of plastic material heretofore known. When the single tail lure 1 is retrieved from the water, it successfully duplicates the natural swimming motion of the eel or a snake. Such action can only occur because the mid-body portion 4 is characterized by a predetermined resilience such that when the lure 1 is in a dynamic mode, the water forces cause an undulation of the mid-body portion 4 from its natural U-shaped configuration in a static mode toward a linear configuration until the resilience is tested to a maximum linear form at which time the lure 1 is caused to revert to the original U-shaped configuration, and wherein continued retrieval of the lure 1 through the water results in a continued undulating pattern.

The head portion 2 moves back and forth along the central plane along the longitudinal axis of the lure 1. The enlarged tail portion 8 similarly moves back and forth along the central plane along the longitudinal axis of the lure 1. The enlarged tail portion 8 creates extra volume at the distal end 9 of the lure 1 giving the tail region 8 an extra "kick" or action.

The U-shape or the curl of the lure 1 provides a great mass at the interior 4B and the base 7 of the lure 1. This greater mass at the base 7 provides a low center of gravity which makes the lure 1 stable while the lure 1 is being retrieved from the water. This low center of gravity keeps the lure 1 stable, while the flat base 7 of the lure 1 provides lifting action because of the resistance it provides to the water.

Thus, as the lure 1 is being retrieved from the water, the lure 1 is stretched out in a longitudinal fashion while the natural tendency of the curl provides the resistance which creates the undulating motion of the lure's head portion 2 and tail 8 portions.

The lizard lure 1, also made of three portions comprises, the head portion 2, the mid-body portion 3, and the tail portion 4. The head 2 and mid-body 3 portions of the lizard are completely different from the preferred embodiment. However, the tail portion 4 of the lizard is identical to the mid-body portion 4 of the preferred embodiment.

The head portion 2 is a relatively short projection from the mid-body portion 3. It is generally shaped like an arrow head. The eyes 5 make the head portion realistic. The mid-body portion 3 has a plurality of legs 6 attached to the main frame 7. The main frame 7 is ridged 8 at the top, while flat at the bottom 9. This flat bottom 9 continues its beginnings from the head portion 2. Four legs 6 project out of the main frame 7 of the mid-body portion 3, however, this requirement is not an absolute, and is only shown for exemplary purposes. The legs 6, in turn, each show four claws 10 and again is only shown for exemplary purposes. The tapering mid-body portion 2 is the beginning of the tail portion 4 with the unusual U-shaped configuration in the static mode as described heretofore.

The lures are made of PVC material or other suitable plastic material with added plasticizer and resin materials which give the lure 1 softness and resiliency essential for the invention. These plastics are made in any range of colors, and for added effect, glitter is added to create a realistic look of bait fish and other live prey in their natural environment.

What is claimed is:

1. A fishing lure of resilient material which, when, retrieved from a body of water successfully duplicates the natural swimming motion of an eel or a snake, and which comprises:

(a) a head portion;
   (b) a mid-body portion formed in a substantially U-shaped configuration attached to said head portion such that when said fishing lure is retrieved through the body of water, said substantially U-shaped configuration imparts an undulating motion; said mid-body portion is characterized by a generally triangular cross-section with concavity on two sides while the third side forms a flat base such that a larger mass of said mid-body portion resides near said flat base; and
   (c) a tail portion attached to said mid-body portion.

2. A fishing lure of claim 1, wherein:

said head portion is characterized by ridges on its top side while its underside is characterized by a flat base.

3. A fishing lure of claim 1, wherein:

said mid-body portion is characterized by a predetermined resilience such that when said fishing lure is in a dynamic mode the forces within the body of water cause an undulation of said mid-body portion, from its natural U-shaped configuration in a static mode, toward a linear configuration until said predetermined resilience is tested to a maximum linear form at which time said fishing lure is caused to revert to an original U-shaped configuration, and any continued retrieval of said fishing lure through the body of water results in a continued undulating motion.

4. A fishing lure of claim 1, wherein:

said larger mass near said flat base of said mid-body portion enhances the resiliency against a natural tendency of said fishing lure to straighten toward a linear configuration as it is drawn through the body of water so as to produce an undulating motion of said head portion and said tail portion.

5. A fishing lure of claim 1, wherein:

said mid-body portion's cross sectional area decreases from the midpoint of said mid-body portion toward said head portions and said tail portion.

6. A fishing lure of claim 5, whereby:

the decrease in said mid-body portion's cross-sectional area correspondingly decreases the resistance provided by said mid-body portion's surface area against the forces within the body of water producing an undulating motion of said mid-body portion and attached said head portion and said tail portion as said fishing lure is drawn through the body of water.

7. A fishing lure of claim 1, whereby:

said mid-body portion having a generally triangular cross-section with a larger mass near its flat base and a low center of gravity making said fishing lure stable while it is being retrieved from the water.

8. A fishing lure of claim 1, wherein:

said tail portion is enlarged from a point where said tail portion joins said mid-body portion to the mid-point of said tail portion, and generally tapering to a point where said tail portion ends.

9. A fishing lure of claim 8, whereby:

said tail portion provides extra body volume at the distal end of said fishing lure to thereby give it added buoyancy producing an added undulating motion.

10. A fishing lure of resilient material which, when, retrieved from a body of water successfully duplicates the natural swimming motion of an eel or a snake, and which comprises:

(a) a head portion;
    (b) an extended mid-body portion attached to said head portion, formed in a substantially U-shaped configuration, such that when said fishing lure is retrieved through the body of water, said U-shaped configuration imparts an undulating motion; said extended mid-body portion is characterized by a generally triangular cross-section with concavity on two sides while the third side forms a flat base such that the larger mass of said mid-body portion resides near said flat base; and
    (c) a tail portion attached to said mid-body portion.

11. A fishing lure of claim 10, wherein:

said head portion is characterized by ridges on its top side while its underside is characterized by a flat base.

12. A fishing lure of claim 10, wherein:

said extended mid-body portion is characterized by a predetermined resilience such that when said fishing lure is in a dynamic mode, the forces within the body of water cause an undulation of said extended mid-body portion from its natural U-shaped configuration in a static mode toward a linear configuration until said predetermined resilience is tested to a maximum linear form at which time said fishing lure is caused to revert to an original U-shaped configuration, and any continued retrieval of said fishing lure through the body of water results in a continued undulating motion.

13. A fishing lure of claim 10, wherein:

(a) said extended mid-body portion is characterized by an elongated body at the point where said extended mid-body portion joins said tail portion such that in a static mode, said tail portion of said fishing lure is longer than said head portion.

14. A fishing lure of claim 13, whereby:

said larger mass near said flat base of said extended mid-body portion enhances the resiliency against the natural tendency of said fishing lure to straighten toward a linear configuration as it is drawn through the body of water so as to produce an undulating motion of attached said head and tail portions.

15. A fishing lure of claim 10, wherein:

said extended mid-body portion's cross-sectional area decreases at a gradual pace from the midpoint of said extended mid-body portion toward said head and tail portions.

16. A fishing lure of claim 15, whereby:

the decrease in said extended mid-body portion's cross-sectional area correspondingly decreases the resistance provided by said extended mid-body portion's surface area against the forces within the body of water producing an undulating motion of said extended mid-body portion and attached said head and tail portions as said fishing lure is drawn through the body of water.

17. A fishing lure of claim 10, whereby:

said extended mid-body portion having a generally triangular cross-section with a larger mass at its flat base and a low center of gravity making said fishing lure stable while it is being retrieved from the body of water.

18. A fishing lure of claim 10, wherein:

said tail portion is enlarged from a point where said tail portion joins said extended mid-body portion to the mid-point of said tail portion, and generally tapering to a point where said tail portion ends.

19. A fishing lure of claim 18, whereby:

said tail portion provides extra body volume at the distal end of said fishing lure to thereby give it added buoyancy producing an added undulating motion.

20. A fishing lure of resilient material which, when, retrieved from a body of water successfully duplicates the natural swimming motion of an eel or a snake, and which comprises:

(a) a head portion;

(b) a mid-body portion attached to said head portion, and formed to be in a substantially U-shaped configuration such that when said lure is retrieved through the water, said U-shaped configuration imparts an undulating motion; and (c) said mid-body portion is characterized by a generally triangular cross-section with concavity on two sides while the third side forms a flat base such that the larger mass of said mid-body portion resides near said flat base.

21. A fishing lure of resilient material which, when, retrieved from a body of water successfully duplicates the natural swimming motion of a lizard, and which comprises:

(a) a head portion;

(b) a mid-body portion attached to said head portion; said mid-body portion having a plurality of legs;

(c) a tail portion attached to said mid-body portion formed in a substantially U-shaped configuration, such that when said lure is retrieved through the water, said U-shaped configuration imparts an undulating motion; and (d) said tail portion is characterized by a generally triangular cross-section with concavity on two sides while the third side forms a flat base such that a larger mass of said tail portion resides near said flat base.

22. A fishing lure of claim 21, wherein:

the top surface of said mid-body portion is characterized by ridges while the underside of said mid-body portion is characterized by a flat surface.

23. A fishing lure of claim 21, wherein:

said mid-body portion is characterized by a plurality of legs and wherein each said leg is characterized by a plurality of claws.

24. A fishing lure of claim 21, wherein:

said tail portion is characterized by a predetermined resilience such that when said fishing lure is in a dynamic mode, the forces within the body of water cause an undulation of said tail portion from its natural U-shaped configuration in a static mode toward a linear configuration until said predetermined resilience is tested to a maximum linear form at which time said tail portion is caused to revert to an original U-shaped configuration, and any continued retrieval of said fishing lure through the body of water results in a continued undulating motion.

25. A fishing lure of claim 21, wherein:

said tail portion's cross-sectional area decreases from the midpoint of said tail portion towards said mid-body portion and similarly decreasing to a point characterizing the tail ending.

26. A fishing lure of claim 25, wherein:

the decrease in said tail portion's cross-sectional area correspondingly decreases the resistance provided by said tail portion's surface area against the forces within the body of water producing an undulating motion of said tail portion as said fishing lure is drawn through the body of water.

27. A fishing lure of claim 21, whereby:

a larger mass residing near the flat base of said tail portion enhances the resiliency against the natural tendency of said fishing lure to straighten toward a linear configuration as it is drawn through the body of water so as to produce an undulating motion of said tail portion.

28. A fishing lure of claim 21, whereby:

a generally triangular cross-section of said tail portion, a larger mass residing near said tail portion's flat base having a low center of gravity, and said flat base make said fishing lure stable while it is being retrieved from the body of water.

* * * * *